US009697094B2

(12) United States Patent
Das et al.

(10) Patent No.: US 9,697,094 B2
(45) Date of Patent: Jul. 4, 2017

(54) DYNAMICALLY CHANGING LOCKSTEP CONFIGURATION

(71) Applicant: Intel Corporation, Santa Clara, CA (US)

(72) Inventors: Debaleena Das, Los Gatos, CA (US); George H Huang, Santa Clara, CA (US); Jing Ling, Milpitas, CA (US); Reza E Daftari, Tustin, CA (US); Meera Ganesan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 14/672,131

(22) Filed: Mar. 28, 2015

(65) Prior Publication Data

US 2016/0232063 A1    Aug. 11, 2016

Related U.S. Application Data

(60) Provisional application No. 62/113,337, filed on Feb. 6, 2015.

(51) Int. Cl.
*G06F 11/00*   (2006.01)
*G06F 11/16*   (2006.01)
(Continued)

(52) U.S. Cl.
CPC ........ *G06F 11/1662* (2013.01); *G06F 3/0619* (2013.01); *G06F 3/0644* (2013.01);
(Continued)

(58) Field of Classification Search
CPC .. G06F 11/1662; G06F 3/0619; G06F 3/0683; G06F 3/0647; G06F 3/0644; G06F 11/2094; G06F 11/2056
See application file for complete search history.

(56) References Cited

U.S. PATENT DOCUMENTS 5,566,316 A   10/1996   Fechner et al.
5,953,742 A    9/1999   Williams
(Continued)

FOREIGN PATENT DOCUMENTS

JP    2012073828      4/2012
WO    2014070200 A1   5/2014

OTHER PUBLICATIONS

International Search Report and Written Opinion for PCT Patent Application No. PCT/US2016/016905, Mailed May 23, 2016, 10 pages.
(Continued)

*Primary Examiner* — Philip Guyton
(74) *Attorney, Agent, or Firm* — Compass IP Law PC

(57) ABSTRACT

Memory subsystem error management enables dynamically changing lockstep partnerships. A memory subsystem has a lockstep partnership relationship between a first memory portion and a second memory portion to spread error correction over the pair of memory resources. The lockstep partnership can be preconfigured. In response to detecting a hard error in the lockstep partnership, the memory subsystem can cancel or reverse the lockstep partnership between the first memory portion and the second memory portion and create or set a new lockstep partnership. The detected error can be a second hard error in the lockstep partnership. The memory subsystem can create new lockstep partnerships between the first memory portion and a third memory portion as lockstep partners and between the second memory portion and a fourth memory portion as lockstep partners. The memory subsystem can also be configured to change the granularity of the lockstep partnership when changing partnerships.

22 Claims, 20 Drawing Sheets

(51) Int. Cl.
*G06F 3/06* (2006.01)
*G06F 11/20* (2006.01)

(52) U.S. Cl.
CPC .......... *G06F 3/0647* (2013.01); *G06F 3/0683* (2013.01); *G06F 11/2094* (2013.01); *G06F 2201/825* (2013.01)

(56) References Cited

U.S. PATENT DOCUMENTS

| | | | |
|---|---|---|---|
| 2003/0088805 | A1 | 5/2003 | Majni et al. |
| 2003/0225970 | A1 | 12/2003 | Hashemi |
| 2007/0239944 | A1 | 10/2007 | Rupanagunta et al. |
| 2009/0031078 | A1* | 1/2009 | Warnes .................. G11C 5/04 711/105 |
| 2011/0066919 | A1 | 3/2011 | Blankenship et al. |
| 2011/0179311 | A1 | 7/2011 | Nachimuthu et al. |
| 2013/0311821 | A1* | 11/2013 | Morris ................ G06F 11/2094 714/6.2 |
| 2013/0332795 | A1 | 12/2013 | Subashchandrabose et al. |
| 2013/0332799 | A1 | 12/2013 | Cho et al. |
| 2013/0339821 | A1 | 12/2013 | Cordero et al. |
| 2014/0006899 | A1* | 1/2014 | Das ..................... G06F 11/1044 714/763 |
| 2014/0047265 | A1 | 2/2014 | Das et al. |
| 2014/0082411 | A1 | 3/2014 | Warnes |
| 2014/0229797 | A1 | 8/2014 | Agrawal et al. |
| 2015/0169447 | A1 | 6/2015 | Stultz et al. |
| 2015/0220410 | A1 | 8/2015 | Das et al. |
| 2016/0093404 | A1* | 3/2016 | Huang .................. G06F 11/073 714/6.13 |

OTHER PUBLICATIONS

Thomas Willhalm, Independent Channel vs. Lockstep Mode—Drive your Memory Faster or Safer, Jul. 11, 2014, retrieved from https://software.intel.com/en-us/blogs/2014/07/11/independent-channel-vs-lockstep-mode-drive-you-memory-faster-or-safer on Sep. 13, 2016.

White Paper, Fujitsu Server Primergy & Primequest Memory performance of Xeon E7-8800 / 4800 v2 (Ivy Bridge-EX) based systems, http://www.fujitsu.com/fts/products/computing/servers/ 2014 Fujitsu Technology Solutions, 27 pages.

* cited by examiner

| 300 | |
|---|---|
| | NORMAL REGION |
| ▓ | NEW FAILURE |
| | ADDDC REGION 0 |
| | ADDDC REGION 1 |
| | ADDDC+1 REGION 0 |
| | ADDDC+1 REGION 1 |
| ╱╱ | FAILURE 0 |
| ✕✕ | FAILURE 1 |

FIG. 3

RANK A

RANK B

RANK A (REGION 0 PRIMARY)

RANK B (REGION 0 BUDDY)

RANK A (REGION 0 PRIMARY)

RANK B (REGION 0 BUDDY)

RANK A (REGION 0 PRIMARY; REGION 1 PRIMARY)　　RANK B (REGION 0 BUDDY; REGION 1 BUDDY)

RANK A (REGION 0 PRIMARY; REGION 1 PRIMARY)　　RANK B (REGION 0 BUDDY; REGION 1 BUDDY)

RANK A (REGION 0 PRIMARY; REGION 1 PRIMARY)   RANK B (REGION 0 BUDDY; REGION 1 BUDDY)

RANK A (REGION 0 PRIMARY; REGION 1 PRIMARY)   RANK B (REGION 0 BUDDY; REGION 1 BUDDY)

RANK A (REGION 0 PRIMARY; REGION 1 PRIMARY)　　RANK B (REGION 0 BUDDY; REGION 1 BUDDY)

RANK A (REGION 0 PRIMARY)　　RANK B (REGION 0 BUDDY)

RANK A (REGION 0 PRIMARY)

RANK B (REGION 0 BUDDY)

RANK A (REGION 0 PRIMARY)

RANK B (REGION 0 BUDDY)

RANK A (REGION 0 PRIMARY)

RANK B (REGION 0 BUDDY)

RANK A (REGION 0 PRIMARY; REGION 0 BUDDY)

RANK B (REGION 1 BUDDY; REGION 1 BUDDY)

RANK A (REGION 0 PRIMARY)

RANK B (REGION 0 BUDDY)

RANK A (REGION 0 PRIMARY; REGION 1 PRIMARY)

RANK B (REGION 0 BUDDY; REGION 1 BUDDY)

RANK A (REGION 0 PRIMARY; REGION 1 PRIMARY)   RANK B (REGION 0 BUDDY; REGION 1 BUDDY)

RANK A (REGION 0 PRIMARY; REGION 1 PRIMARY)   RANK B (REGION 0 BUDDY; REGION 1 BUDDY)

RANK A

RANK B

RANK A (REGION 0 PRIMARY)

RANK B (REGION 0 BUDDY)

RANK A (REGION 0 PRIMARY)

RANK B (REGION 0 BUDDY)

RANK A (REGION 0 PRIMARY)

RANK B (REGION 0 BUDDY)

RANK A (REGION 0 PRIMARY; REGION 1 PRIMARY)　　　RANK B (REGION 0 BUDDY; REGION 1 BUDDY)

RANK A (REGION 0 PRIMARY)　　　RANK B (REGION 0 BUDDY)

RANK A (REGION 0 PRIMARY)

D17 D16 D15 D14 D13 D12 D11 D10 D9 D8 D7 D6 D5 D4 D3 D2 D1 D0

CB9

RANK B (REGION 0 BUDDY)

RANK A (REGION 0 PRIMARY; REGION 1 BUDDY)

D17 D16 D15 D14 D13 D12 D11 D10 D9 D8 D7 D6 D5 D4 D3 D2 D1 D0

AR3

RANK B (REGION 0 BUDDY; REGION 1 PRIMARY)

RANK A (REGION 0 PRIMARY)

RANK B (REGION 1 PRIMARY)

RANK C (REGION 0 BUDDY)

RANK D (REGION 1 BUDDY)

RANK A (REGION 0 PRIMARY)

RANK B (REGION 1 PRIMARY; REGION 1 BUDDY)

RANK C (REGION 0 BUDDY)

RANK D

DYNAMICALLY CHANGING LOCKSTEP CONFIGURATION

RELATED CASE

The present application is a nonprovisional application based on U.S. Provisional Application No. 62/113,337, filed Feb. 6, 2015, and claims the benefit of priority of that provisional application. The provisional application is hereby incorporated by reference.

FIELD

Embodiments of the invention are generally related to memory management, and more particularly to dynamically changing lockstep configuration.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2015, Intel Corporation, All Rights Reserved.

BACKGROUND

Certain types of memory resources have high failure rates compared to most other platform components. For example, DDR (dual data rate) memory devices experience higher rates of failure than most other components (such as processors, storage, interface components, and/or others) that are part of a computing platform or server environment. Long-term storage components also experience significant rates of failure. Given that failures to the memory devices cause downtime and require servicing to a system, higher platform RAS (reliability, availability, and serviceability) is preferred.

Traditionally there are multiple different sparing techniques employed to survive hard DRAM (dynamic random access memory) failures or hard errors, which can push out service requirements. A hard error refers to an error with a physical device which prevents it from reading and/or writing correctly, and is distinguished from transient errors which are intermittent failures. Techniques are known for SDDC (single device data correction) and DDDC (double device data correction) to address hard failure. However, despite techniques for pushing out servicing of a memory subsystem, failure rates remain higher than desired, especially for larger memory configurations.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 3 is a legend for FIGS. 4A-9I, which illustrate logical representations of the states identified in FIG. 2.

FIG. 4A is a logical representation of an initial bank failure.

FIG. 4B is a logical representation of a lockstep action to produce an ADDDC state in Region 0 responsive to an initial bank failure.

FIG. 5A is a logical representation of a different bank failure in a different memory device.

FIG. 5B is a logical representation of a lockstep action to produce an ADDDC state in Region 1 responsive to an additional bank failure in a different memory device.

FIG. 5C is a logical representation of a same bank failure in a different memory device when in an ADDDC state with failures in Region 0 and Region 1.

FIG. 5D is a logical representation of a lockstep action to elevate to an ADDDC+1 state responsive to a same bank failure in a different memory device.

FIG. 5E is a logical representation of an additional same bank failure in a different memory device when in an ADDDC+1 state with an additional Region 0 failure.

FIG. 5F is a logical representation of a lockstep action to elevate to an ADDDC+1 state with failures in Region 0 and Region 1 responsive to an additional same bank failure in a different memory device.

FIG. 6A is a logical representation of a same bank failure in a different memory device when in an ADDDC state with a failure in Region 0.

FIG. 6B is a logical representation of a lockstep action to elevate to an ADDDC+1 state with failures in Region 0 responsive to a same bank failure in a different memory device.

FIG. 7A is a logical representation of a same bank failure in the buddy region when in an ADDDC state.

FIG. 7B is a logical representation of a lockstep action to elevate to an ADDDC+1 state with failures in the same bank in both the primary and buddy regions.

FIG. 7C is a logical representation of a lockstep action to reassign lockstep partnerships to remain in an ADDDC state with buddy regions mapped within common ranks.

FIG. 8A is a logical representation of a same device, different bank failure when in an ADDDC state.

FIG. 8B is a logical representation of a lockstep action to produce an ADDDC state in Region 1 responsive to a same device, additional bank failure.

FIG. 8C is a logical representation of a different device, different bank failure when in an ADDDC state having failures in the same bank of Region 0 and Region 1.

FIG. 8D is a logical representation of a different device, same bank failure when in an ADDDC state having failures in the same bank of Region 0 and Region 1.

FIG. 8E is a logical representation of an initial device failure.

FIG. 9A is a logical representation of a lockstep action to produce an ADDDC state in a buddy rank responsive to an initial device failure.

FIG. 9B is a logical representation of an additional device failure in the failed rank when in an ADDDC state.

FIG. 9C is a logical representation of an additional bank failure of a different device when in the failed rank in an ADDDC state.

FIG. 9D is a logical representation of a lockstep action to produce an ADDDC+1 state responsive to an additional device failure.

FIG. 9E is a logical representation of a same device failure in the buddy rank when in an ADDDC state.

FIG. 9F is a logical representation of a new bank failure in the same device in the buddy rank when in an ADDDC state.

FIG. 9G is a logical representation of a lockstep action to produce an ADDDC+1 state responsive to an additional device failure in the buddy rank.

FIG. 9H is a logical representation of a lockstep action to reassign lockstep partnerships to remain in an ADDDC state with buddy regions mapped to new ranks responsive to a same device failure in the buddy region.

FIG. 9I is a logical representation of a lockstep action to reassign lockstep partnerships to remain in an ADDDC state with a new buddy rank for a rank with a failed device, and a buddy bank within the previous buddy rank responsive to a new bank failure in the same device of the buddy region.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, memory subsystem error management enables dynamically changing lockstep partnerships. Lockstep refers to distributing error correction over multiple memory resources to compensate for a hard failure in one memory resource that prevents deterministic data access to the failed memory resource. A lockstep partnership refers to two portions of memory over which error checking and correction is distributed or shared. A memory subsystem detects a hard error in a first memory portion, where the first memory portion is set in a lockstep partnership with a second memory portion to spread error correction over the pair of memory resources. In response to detecting the hard error, the memory subsystem can reverse the lockstep partnership between the first memory portion and the second memory portion and set a new lockstep partnership. In one embodiment, the lockstep partnership is formed in response to detecting a failure or hard error in the second memory portion. The memory subsystem can create new lockstep partnerships between the first memory portion and a third memory portion as lockstep partners and between the second memory portion and a fourth memory portion as lockstep partners. The memory subsystem can also be configured to change the granularity of the lockstep partnership when changing partnerships.

The dynamic changing of lockstep partnerships can be applied to any application of lockstep. In one embodiment, the memory controller includes a lockstep table that represents lockstep relationships between portions of memory. The portion size can be configured for an implementation of lockstep. In one embodiment, such as in an implementation of DDDC (dual device data correction), the lockstep relationships can be preconfigured. Thus, a detected error results in error correction sharing between identified lockstep partners. As described herein, the lockstep partnerships can be dynamically reversed and reassigned. In one embodiment, such as in an implementation of ADDDC (adaptive dual device data correction), lockstep relationships are not defined until a first error is detected. For such an implementation, the first assignment of lockstep partners can be reversed and reassigned. For purposes of illustration only, most of the following descriptions and the figures refer to an implementation of ADDDC. It will be understood that the dynamic lockstep partnership changing or the dynamic changing of the lockstep configuration can be performed on any system that applies lockstep partnerships that can be configured to be reversed and reassigned. Thus, examples related to ADDDC will be understood as examples only, and are not restrictive.

Figure 1A:
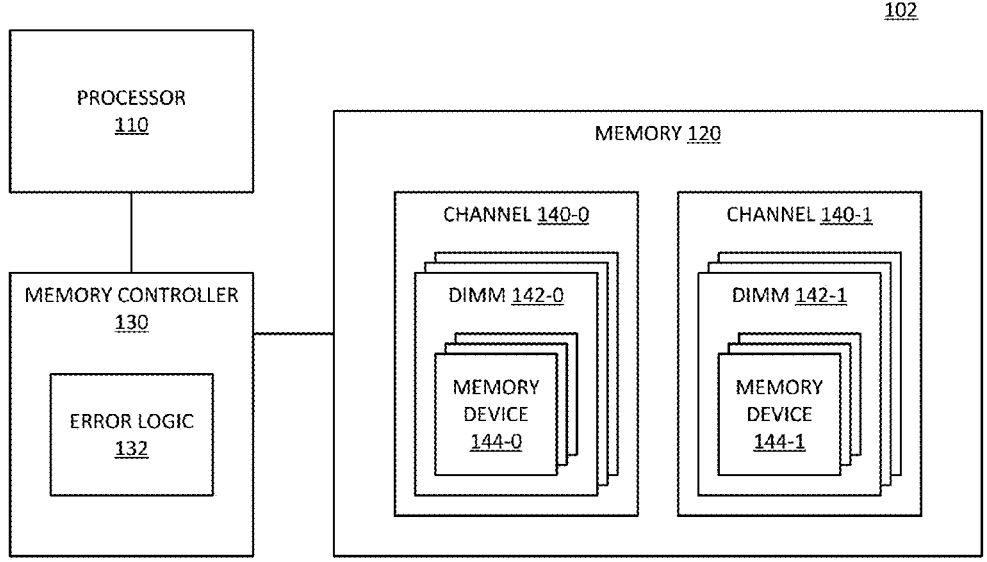
FIG. 1A is a block diagram of an embodiment of a system that distributes cachelines between channels in which dynamic lockstep management is implemented.

FIG. 1A is a block diagram of an embodiment of a system that distributes cachelines between channels in which dynamic lockstep management is implemented. System 102 illustrates elements of a memory subsystem. Processor 110 represents hardware processing resources in system 102 that executes code and generates requests to access data and/or code stored in memory 120. Processor 110 can include a central processing unit (CPU), graphics processing unit (GPU), application specific processor, peripheral processor, and/or other processor that can generate requests to read from and/or write to memory 120. Processor 110 can be or include a single core processor and/or a multicore processor. Processor 110 generates requests to read data from memory 120 and/or to write data to memory 120 through execution of code. The code can include code that is stored locally to processor 110 and/or code stored in memory 120.

Memory controller 130 represents logic in system 102 that manages access to memory 120. For access requests generated by processor 110, memory controller 130 generates one or more memory access commands to send to memory 120 to service the requests. In one embodiment, memory controller 130 can be a standalone component on a logic platform shared by processor 110 and memory 120. In one embodiment, memory controller 130 is part of processor 110. In one embodiment, memory controller 130 is a separate chip or die from processor 110, and is integrated on a common substrate with the processor die/chip as a system on a chip (SoC). In one embodiment, one or more memory resources of memory 120 can be integrated in a SoC with processor 110 and/or memory controller 130. Memory controller 130 manages configuration and status of memory 120 in connection with managing access to the memory resources. Memory controller 130 can be configured to generate the commands and manage access to data resources in a way expected to maximize bandwidth utilization of memory 120.

In one embodiment, memory controller 130 manages memory 120 as a scalable memory buffer or other memory configuration where system 102 distributes cachelines between multiple channels 140. For example, memory 120 is illustrates having two channels, 140-0 and 140-1. It will be understood that the techniques described could be applied across more channels 140. In one embodiment, memory controller 130 distributes cachelines between separate channels 140 by locating half of a cacheline on DIMM (dual inline memory module) 142-0 of channel 140-0 and the other half of the cacheline on DIMM 140-1 of channel 140-1. The use of more channels can provide the same benefits, although the logic to implement the separating of the cachelines between the multiple channels may need to be modified. Running the memory channels in lockstep mode across channels 140 has the advantage of being able to apply DDDC (double device data correction). Lockstep mode refers to a state of operation in which a lockstep partnership is set and the lockstep partners share error correction data. Each channel 140 includes one or more DIMMs 142. Each DIMM includes multiple memory devices 144. In one embodiment, each memory device 144 is a DRAM (dynamic random access memory) chip or device. It will be understood that in simpler system configurations, similar benefits could be achieved by separating memory devices 126 into channels 140, without necessarily needing to further separate memory devices 126 into DIMMs 142.

In one example configuration, consider that system 102 includes two channels 140, each channel having one DIMM 142 for purposes of this example, with 16 memory devices 126 per DIMM, plus one memory device 126 each for CRC (Cyclic Redundancy check) and for parity. If one memory device 126 fails, its data can be reconstructed with single device data correction (SDDC). For DDDC, system 102, via memory controller 130, can combine two memory devices 126 from two DIMMs 142, using 4 memory devices 126 per pair of DIMMs 142. Such a technique provides for 32 "data" devices, two devices for CRC (cyclic redundancy checking), one device for parity, and one spare device. If one of the memory devices 126 fails, the spare device can replace the failed device. After the failure of one memory device 126, traditional SDDC can be employed. Thus, DDDC allows recovery from two sequential DRAM failures on DIMMs 142, as well as recovery from a subsequent single-bit soft error on a DIMM 142.

System 102 can implement ADDDC (adaptive double device data correction) to manage hard errors or hard failures. ADDDC provides lockstep to provide error correction for memory devices 126. ADDDC can use lockstep to carve out space for a spare device upon encountering a hard failure. System 102 can substitute a first memory device failure in a lockstep rank/bank to a spare device. More details regarding rank and bank architecture of memory 120 can be in accordance with that of system 104 of FIG. 1B. With ADDDC, a second failure within a lockstep rank/bank would traditionally trigger a service event. Thus, typically a second failure within the same region would trigger a service call. In one embodiment, with the ability to dynamically change lockstep configuration, in general a second failure in the lockstep partnership does not result in a service call if the two failures are in separate halves of the lockstep partnership.

In one embodiment, memory controller 130 includes error logic 132 to manage error response, including lockstep configurations. In one embodiment, logic 132 can dynamically change lockstep partnerships. More specifically, logic 132 can enable memory controller to initially set or create lockstep partnerships to spread error correction over a pair of memory resources, and then cancel or reverse the lockstep partnership upon detection of an additional error in the lockstep partnership. After reversing the lockstep partnership, memory controller 130 via error logic 132 can create or set one or more new lockstep partnerships in response to the additional error to prevent generating a service call event. Dynamically reversing a lockstep partnership and setting one or more new lockstep partnerships can extend the ability of the ADDDC to handle error correction for at least one more additional hard error.

Figure 1B:
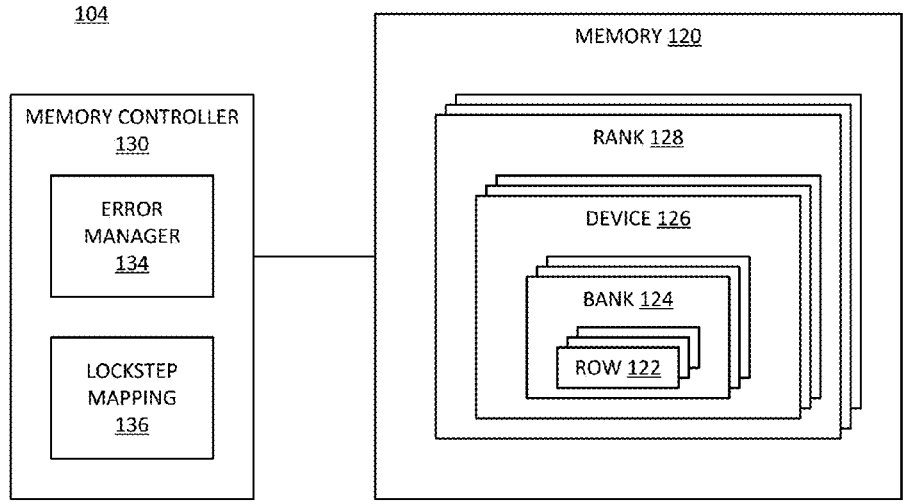
FIG. 1B is a block diagram of an embodiment of the system of FIG. 1A illustrating memory structure and lockstep logic.

FIG. 1B is a block diagram of an embodiment of the system of FIG. 1A illustrating memory structure and lockstep logic. System 104 is one embodiment of system 102 of FIG. 1B. Processor 110 is eliminated for purposes of simplicity, but it will be understood that processing resources generate data access requests for memory 120. Memory 120 is illustrated in more detail showing a configuration of memory resources. One or more memory devices 126 are grouped in a rank 128. In one embodiment, a DIMM 142 of system 102 can include one or two ranks 128. In one embodiment, ranks 128 can include memory devices across physical boards or substrates. Each memory device 126 includes multiple banks 124, which are an addressable group of rows 122 or cachelines. In one embodiment, row 122 includes multiple cachelines. In one embodiment, each row 122 includes a page of cachelines. Each bank 124 can includes multiple rows 122.

Referring again to an implementation of ADDDC, system 104 (and system 102 of FIG. 1A) can provide improved ADDDC by dynamically changing lockstep partners. By dynamically changing lockstep partners, system 104 via memory controller 130 can prevent service calls in many circumstances that would traditionally require a service call. Thus, ADDDC can further improve service rates by a significant margin by providing the ability to survive the additional hard failure in a lockstep pair. The lockstep partners refer to the pair of banks 124 or ranks 128 or other memory portions that are working in lockstep. It will be understood that banks 124 and/or ranks 128 can be partnered in a lockstep relationship across DIMMs and/or channels of memory 120. In one embodiment, other levels of granularity besides banks or ranks can be employed for lockstep operation. Thus, descriptions with respect to bank or rank level granularity should be understood as exemplary, and are not restrictive.

Most RAS improvements have an associated capacity or performance cost. However, dynamically changing lockstep partners can work with and significantly improve existing ADDDC implementations without any design, performance, or capacity cost. Thus, dynamically changing lockstep partners can be employed for ADDDC in server environments, such as standalone servers, and/or server systems in which components are blades mounted in a server chassis. Additionally, changing lockstep partners can apply to legacy DDDC with design updates.

It will be understood that traditional ADDDC implementations apply virtual lockstep to map out up to two sequential DRAM device failures per lockstep region. In a traditional ADDDC implementation, memory 120 would start in non-lockstep configuration until the first device failure. After the first device failure, memory controller 130 can apply a sparing engine (not specifically shown, but can be considered part of error manager 134) to convert the failure region to virtual lockstep. In virtual lockstep, a cacheline becomes stored across two memory locations. In one embodiment, the two memory locations can be referred to as Primary and Buddy locations. Such terminology will be used herein, but it will be understood that other terminology could be used without affecting the techniques of changing lockstep partners. A second sequential failure in the region covered by the lockstep partnership can be mapped out by moving to ADDDC+1 mode. With traditional ADDDC, the second sequential failure triggers the need for a service call to replace the failed memory.

It was observed that memory subsystems employing the dynamic lockstep partnership changes described herein were able to survive approximately 50% of the second failures that affect a lockstep rank/bank. By providing the ability to survive even a second failure event in a lockstep pair, the RAS for the memory subsystem improves significantly. Improved RAS for the memory subsystem can significantly reduce service costs. It was observed that traditional ADDDC can improve service rates by a factor of 10× for large configurations. It will be understood that large configurations will have a large number of configuration parameters, and therefore exact numbers of service rates and service rate improvements will vary for each system based on its specific configuration. The use of dynamically changing lockstep partnerships can often allow the system to survive an additional hard failure (e.g., approximately 50% of the time). Thus, it is expected that dynamically changing lockstep partners can provide a further improvement of 5×. Estimates are approximate and can have a wide variance based on memory configuration.

In one embodiment, memory controller 130 includes error manager 134, which can be part of error logic 132 of system 102 of FIG. 1A. In one embodiment, memory controller 130 also includes lockstep mapping 136 as part of error manager 134 and/or as part of error logic 132. In one embodiment, lockstep mapping 136 is part of error manager 134, but they are not necessarily combined. Error manager 134 enables memory controller 130 to detect errors and determine an ADDDC state to apply to handle error correction for the error. Different ADDDC states are described in reference to FIGS. 2 through 9I below. Lockstep mapping 136 provides a mapping of what portions of memory are currently associated or set as lockstep partners. Error manager 134 includes determination logic to determine whether the current level of error correction or the current lockstep mapping 136 is sufficient to manage known hard errors. Error manager 134 includes determination logic to determine when and how to change lockstep partnerships to respond to additional errors that might occur in an existing lockstep partnership.

In one embodiment, error manager 134 applies an implementation of ADDDC that uses virtual lockstep partners to handle error correction. In one embodiment, error manager 134 applies error correction with lockstep partners that are not virtual lockstep partners. In either case, error manager 134 includes logic to reverse a lockstep partnership and establish new lockstep partnerships. It will be understood that the "logic" referred to for error manager 134 and/or for other components described herein can refer to hardware and/or software (including firmware) logic. The logic configures the element to perform operations to accomplish what is described.

In one embodiment, error manager 136 can dynamically change the configuration of lockstep partners in lockstep mapping 136. In traditional lockstep systems, the partnerships are fixed once set. Thus, errors occurring after the setting of a lockstep partnership would traditionally require a service call to replace the failed parts. As described herein, the lockstep partnership can be undone or reversed and then a new lockstep partnership set. Memory controller 130, e.g., via error manager 134, can perform both forward and reverse sparing operations to set and unset lockstep partnerships.

Memory controllers with sparing logic are traditionally able to spare in the forward direction, and typically perform the forward sparing at a single fixed granularity. With reverse sparing, memory controllers are capable of memory sparing at multiple granularities such as: bit, device, cacheline, row, column, bank, sub-rank, rank, and dual inline memory module (DIMM). Reverse sparing allows the memory controllers to reverse or undo a sparing operation previously performed, which can allow the changing of lockstep partnerships and/or the changing of granularities of the failure states. Reverse sparing refers to moving a failure state backwards, such as moving from an N+1 failure state to an N failure state.

As used herein, "forward sparing" can refer to physically moving data from a failed region of memory and storing it in new location where subsequent accesses to that data will be retrieved from the new location and not the failed location. "Reverse sparing" can refer to physically moving data from the new location back to the original failed location. Typically, reverse sparing will be done with the intent of subsequently forward sparing to another portion, at either the same or a different granularity. Memory controller 130 can use ECC (error correction coding) techniques to correct interim errors between the reverse sparing and subsequent forward sparing operations.

It will be understood that memory 120 can have an architecture with addressable regions of size cacheline, column, row, bank, sub-rank, rank, DIMM, and channel, from smallest to largest. Each memory failure may be thought of as having 1) a particular region or section or portion affected; and, 2) a width (number of bits) affected. Memory devices 126 include address decoders or decoding logic to translate a received command address to a physical location with the memory.

As mentioned above, in one embodiment, error manager 134 can include memory sparing logic configured to perform memory sparing operations in both the forward and reverse directions. For example, the memory sparing logic may initially perform a forward sparing operation in response to a detected memory failure at a first level of granularity, such as the bank level, moving the failure state from N to N+1. If error manager 134 detects a failure condition in another portion (e.g., at a higher level of granularity and/or in another portion of a lockstep partnership), it can perform a reverse sparing operation, moving the failure level from N+1 back to N and then perform forward sparing to move the failure level or error level from N back to N+1 with different granularity and/or with a different lockstep partnership.

Reference to memory devices can apply to different memory types. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), WIO3 (Wide I/O 3, currently in discussion by JEDEC), HBM2 (HBM version 2), currently in discussion by JEDEC), and/or others, and technologies based on derivatives or extensions of such specifications.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as NAND or NOR technologies. Thus, a memory device can also include a future generation nonvolatile devices, such as a three dimensional crosspoint memory device, or other byte addressable nonvolatile memory device. In one embodiment, the memory device can be or include multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Figure 2:
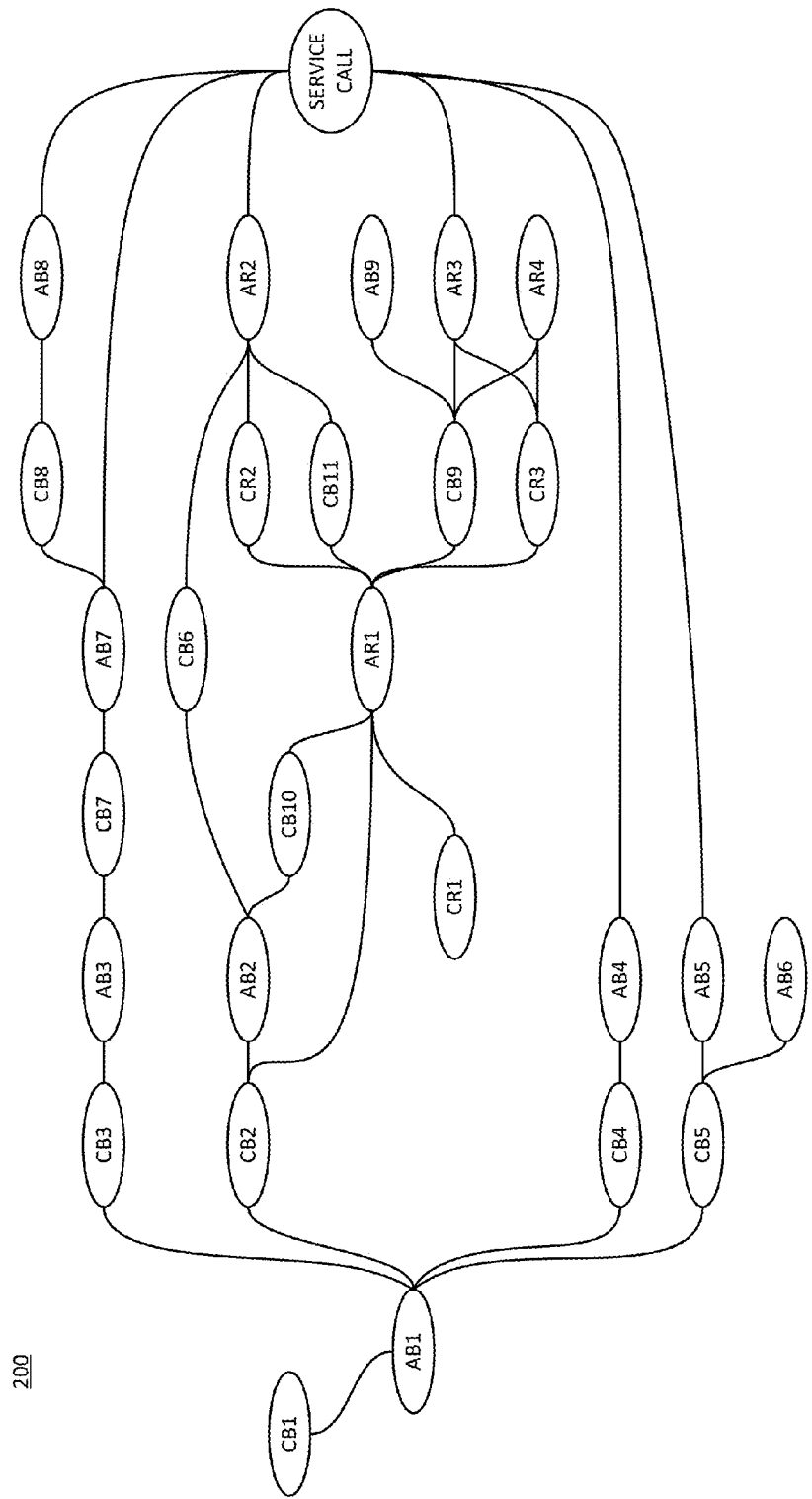
FIG. 2 is a block diagram of an embodiment of a state machine for an adaptive double device data correction (ADDDC) implementation in a system in which dynamic lockstep management is implemented.

FIG. 2 is a block diagram of an embodiment of a state machine for an adaptive double device data correction (ADDDC) implementation in a system in which dynamic lockstep management is implemented. It will be understood that state diagram 200 is merely one example of any number of possible state flows. The example states represented with the labels in diagram 200 are set out in FIGS. 4A-9I.

In one embodiment, starting at state CB1 (case 1 of bank failure), and proceed to AB1 (action 1 for bank failure CB1). From AB1, several additional failure scenarios are possible. Starting with the simpler cases, the state could proceed from AB1 to CB4 (case 4 of bank failure) for a subsequent error of type CB4, and then to AB4 (action 4 for bank failure CB4). Once AB4 has been performed, a subsequent failure would result in a service call. It will be understood that in each case, movement from one state to another would be performed by a memory controller associated with the memory device experiencing the identified hard failures. The state could alternatively proceed from AB1 to CB5 (case 5 of bank failure) for a subsequent error of type CB5. The memory controller can perform one of two actions in response to CB5, identified as AB5 (action 5 for bank failure CB5) and AB6 (action 5 for bank failure CB5). Once either AB5 or AB6 has been performed, a subsequent failure would result in a service call.

The state could alternatively proceed from AB1 to CB3 (case 3 of bank failure) for a subsequent error of type CB3. The memory controller can perform error correction AB3 (action 3 for bank failure CB3). A subsequent error at state AB3 can result in CB7 (case 7 of bank failure), in response to which the memory controller can perform the error correction actions of AB7 (action 7 for bank failure CB7). From state AB7, a subsequent error could result in a service call, depending on the error type, or could result in a subsequent error state CB8 (case 8 of bank failure). In response to state CB8, the memory controller can perform the error correction of state AB8 (action 8 for bank failure CB8). After state AB8, a subsequent failure would result in a service call.

The state could alternatively proceed from AB1 to CB2 (case 2 of bank failure) for a subsequent error of type CB2. The memory controller can perform one of two different error correction action, either AB2 (action 2 for bank failure CB2), or AR1 (action 1 for rank failure). It will be observed that the state can be changed from bank failure to rank failure for subsequent error of type CB2. As seen in diagram 200, the memory controller can alternatively arrive at state AR1 as a result of an initial rank error of type CR1 (case 1 of rank failure).

Returning to state AB2, a subsequent error can result in one of two subsequent error states, depending on the error type. Thus, from AB2 the state can move to CB10 (case 10 of bank failure), for which the memory controller can perform the error correction of AR1 mentioned above. Alternatively, the state can move from AB2 to CB6 (case 6 of bank failure). The memory controller can perform the error correction of AR2 (action 2 for rank failure) in response to state CB6. As seen in diagram 200, there are four potential error states for a failure subsequent to state AR1. Two of those failure states are CR2 (case 2 of rank failure) and CB11 (case 11 of bank failure), in response to which the memory controller can perform the error correction of state AR2, mentioned above.

Alternatively to moving to either CR2 or CB11, an error subsequent to AR1 can result in the state moving to CB9 (case 9 of bank failure) or CR3 (case 3 of rank failure), depending on the error. If the error results in state CR3, the memory controller can perform the error correction of AR3 (action 3 for rank failure) or AR4 (action 4 for rank failure). If the state moves to AR3, a subsequent error would result in a service call. In response to state CB9, the memory controller can move to AR3 or AR4, or perform the error correction of AB9 (action 9 for bank failure CB9).

FIG. 3 is a legend for FIGS. 4A-9I, which illustrate logical representations of the states identified in FIG. 2. Table 300 illustrates a blank box (no shading or cross-hatching) for a normal region of memory. Such a section of memory is not experiencing any failure, and is not part of a lockstep partnership. The darkest level of shading (nearly black) shows a new failure. The lightest level of shading (lightest gray) represents a state of ADDDC Region 0. Thus, the lightest gray illustrates the primary and buddy regions of an ADDDC state for a first hard failure.

The next level of gray represents a state of ADDDC Region 1. ADDDC Region 1 refers to the primary and buddy regions that are partnered for a subsequent failure when the memory is already in failure state ADDDC. The next two darker levels of shading, respectively, represent ADDDC+1 Region 0 and ADDDC+1 Region 1. Thus, they represent primary and buddy regions for, respectively, an elevated ADDDC state for subsequent errors. The single-line cross-hatch represents the portion of memory declared as the first failure (Failure 0) in a region. The double-line crosshatch represents the portion of memory declared as the second failure (Failure 1) in the region.

FIG. 4A is a logical representation of an initial bank failure, represented as state CB1. Each of the states represented show D[17:0] indicating 18 memory devices (e.g., DRAMs), and B[15:0] indicating 16 banks per device. For purposes of logical representation, a bank failure is the finest granularity considered in the examples, although other failure granularity can be configured in certain implementations following the same techniques described in these examples.

Thus, while the diagrams represent Ranks each with 18 devices having 16 banks per device, the examples are non-limiting. Thus, different configurations are possible. Two ranks (Rank A and Rank B) are shown as an example of primary and buddy ranks to use for lockstep partnerships portions. CB1 shows an initial failure in Bank 0 of Device 0 of Rank A.

FIG. 4B is a logical representation of a lockstep action to produce an ADDDC state in Region 0 responsive to an initial bank failure, represented as state AB1. The memory controller generates state AB1 by creating Bank 0 of Rank B as a buddy region for Bank 0 of Rank A (the primary region). With the lockstep partnership, the memory subsystem is in a first ADDDC state.

FIG. 5A is a logical representation of a different bank failure in a different memory device, represented as state CB3. State CB3 illustrates a subsequent bank failure when the system is already in an ADDDC state. Thus, Bank 0 of Device 0 of Rank A is shown as Failure 0, and Bank 1 of Device 1 of Rank is shown as a currently detected error. The error of CB3 is thus a different bank in a different device in the same (primary) rank.

FIG. 5B is a logical representation of a lockstep action to produce an ADDDC state in Region 1 responsive to an additional bank failure in a different memory device, represented as state AB3. In state AB3, the memory controller produces an ADDDC state with Failure 0 in Bank 0 and Failure 1 in Bank 1, both of which are shared between Rank A and buddy Rank B for purposes of error correction. Reads to such error portions can be handled by error correction techniques described above with respect to forward sparing.

FIG. 5C is a logical representation of a same bank failure in a different memory device when in an ADDDC state with failures in Region 0 and Region 1, represented as state CB7. In state CB7, a subsequent error occurs in Bank 0 of Device 2 of Rank A. It will be understood that since Bank 0 is already subject to error correction with ADDDC, the second error is the most errors that can be handled by known error correction techniques. The subsequent error is a same bank, different device error in the primary rank.

FIG. 5D is a logical representation of a lockstep action to elevate to an ADDDC+1 state responsive to a same bank failure in a different memory device, represented as state AB7. In state AB7, the memory controller elevates the state of Bank 0 to ADDDC+1, with Failure 0 and Failure 1 in Bank 0. Subsequent failures cannot be handled, so thus a service call can be generated.

FIG. 5E is a logical representation of an additional same bank failure in a different memory device when in an ADDDC+1 state with an additional Region 0 failure, represented as state CB8. If instead the subsequent failure is Failure 1 in Bank 1, such as error in same Bank 1, different Device 3, then another error correction state can be used.

FIG. 5F is a logical representation of a lockstep action to elevate to an ADDDC+1 state with failures in Region 0 and Region 1 responsive to an additional same bank failure in a different memory device, represented as AB8. In AB8 elevates the state of Bank 1 to ADDDC+1. With both Bank 0 in ADDDC+1 and Bank 1 in ADDDC+1, a subsequent failure cannot be handled and thus a service call can be generated.

FIG. 6A is a logical representation of a same bank failure in a different memory device when in an ADDDC state with a failure in Region 0, represented as state CB4. In state CB4, Bank 0 has Failure 0 in Device 0 of Rank A, and a subsequent failure is detected in the same Bank 0 of different Device 1.

FIG. 6B is a logical representation of a lockstep action to elevate to an ADDDC+1 state with failures in Region 0 responsive to a same bank failure in a different memory device, represented as AB4. The memory controller elevates Bank 0 to ADDDC+1, seeing in has two failure regions, Failure 0 and Failure 1. A subsequent error in the same Bank 0 would not be able to be handled, and thus the memory controller may issue a service call. A subsequent error in a different bank could elevate the additional bank to ADDDC.

FIG. 7A is a logical representation of a same bank failure in the buddy region when in an ADDDC state, represented as state CB5. In state CB5, there is already an error The subsequent error in CB5 is the same Bank 0 in Device 0 of Rank B. Thus, both Ranks A and B have hard errors in Bank 0, Device 0.

FIG. 7B is a logical representation of a lockstep action to elevate to an ADDDC+1 state with failures in the same bank in both the primary and buddy regions, represented as AB5. In state AB5, the memory controller elevates the state of Bank 0 from ADDDC to ADDDC+1 due to the two errors in the bank that is the subject of a lockstep partnership.

FIG. 7C is a logical representation of a lockstep action to reassign lockstep partnerships to remain in an ADDDC state with buddy regions mapped within common ranks, represented as state AB6. Alternatively to state AB5, in one embodiment, in response to the subsequent error detected in state CB5, the memory controller reverses the lockstep partnership between Bank 0, Rank A and Bank 0, Rank B, and reassigns lockstep partnerships. More specifically, in one embodiment, the memory controller can make Bank 15 of Rank A the buddy portion or buddy region for Bank 0 of Rank A, and similarly can make Bank 15 of Rank B the buddy portion or buddy region for Bank 0 of Rank B. Bank 15 is an example, and another bank could be selected. The same bank does not necessarily need to be selected in each of the ranks. After reassigning the lockstep partnership, state AB6 results in Banks 0 and 15 of Rank A in ADDDC with a single error, and Banks 0 and 15 of Rank B in ADDDC with a single error, as opposed to Bank 0 in both ranks being in ADDDC+1. Thus, dynamically changing the lockstep partnership can reduce the ADDDC level, and permit the system to sustain an addition subsequent error over keeping the same lockstep partnerships.

FIG. 8A is a logical representation of a same device, different bank failure when in an ADDDC state, represented as state CB2. In state CB2, Bank 0 of Device 0 of Rank A is already in failure, and Bank 0 is in state ADDDC across Ranks A and B. The subsequent failure detected is a different bank, same device failure in Bank 1 of Device 0.

FIG. 8B is a logical representation of a lockstep action to produce an ADDDC state in Region 1 responsive to a same device, additional bank failure, represented as state AB2. In state AB2, the memory controller can elevate Bank 1 to ADDDC, with Bank 1 shared in primary Rank A and buddy Rank B.

FIG. 8C is a logical representation of a different device, different bank failure when in an ADDDC state having failures in the same bank of Region 0 and Region 1, represented as state CB6. In CB6, the subsequent error detected is a different bank, different device error, with the error in Bank 2 of Device 1. Such an error can result in a service call, since Bank 0 and Bank 1 are already in ADDDC. In one embodiment, the memory controller could reverse the lockstep partnership between Rank A and Rank B of Bank 0, as well as the lockstep partnership between Rank A and Rank B of Bank 1. The memory controller could subsequently create a lockstep partnership between Rank A and Rank B of Device 0 and a lockstep partnership between Rank A and Rank B of Device 1. The partnerships could both be in ADDDC. Such an action is not illustrated, but is possible by reversing the lockstep partnerships and changing the granularity of the lockstep.

FIG. 8D is a logical representation of a same device, different bank failure when in an ADDDC state having failures in the same bank of Region 0 and Region 1, represented as state CB10. In state CB10, the subsequent error detected is in the same Device 0, different Bank 2.

Figures 8E, 9A:
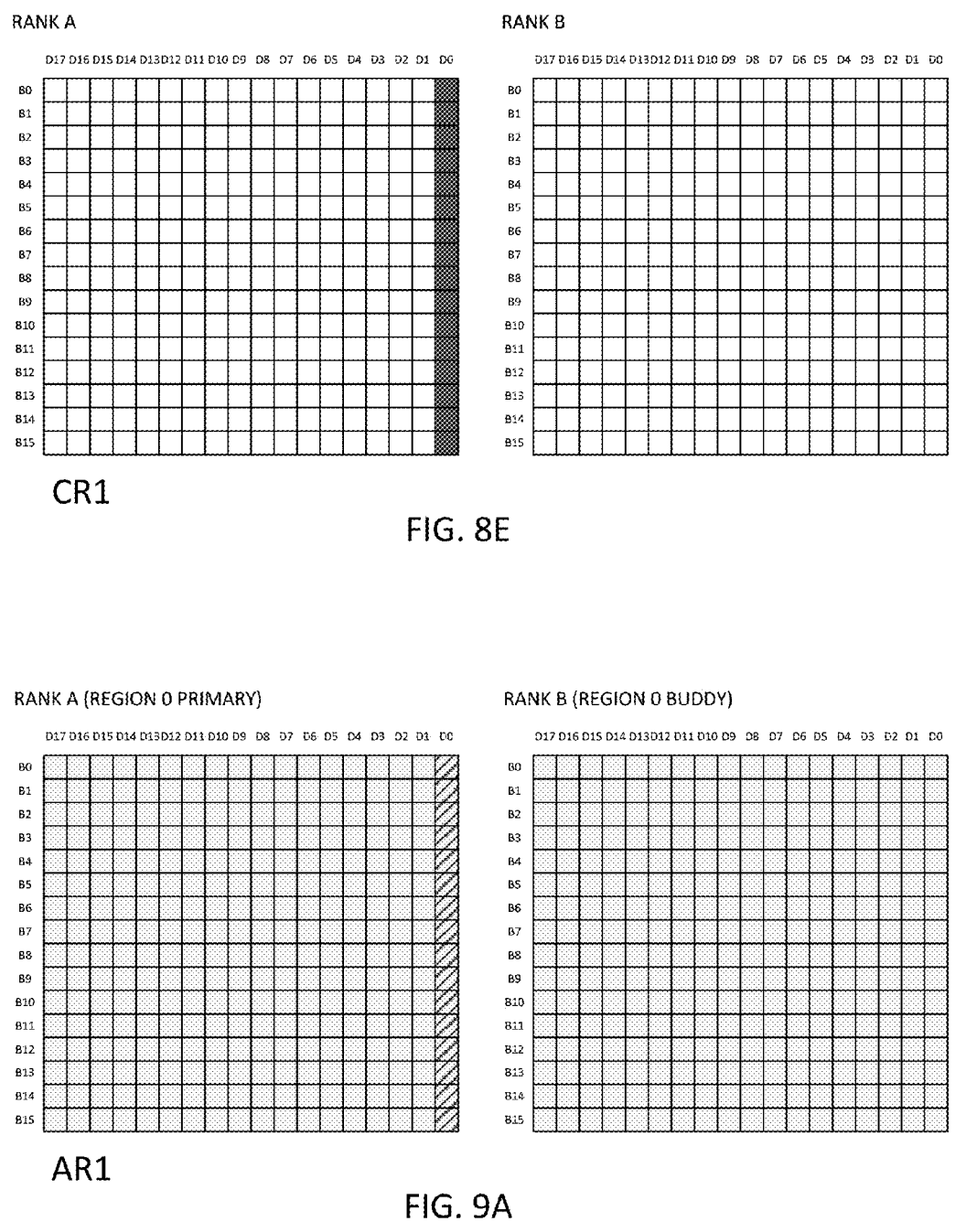

FIG. 8E is a logical representation of an initial device failure, represented as state CR1. In state CR1, the error is all of Device 0 of Rank A. It will be observed how the error of state CB10 could be made to match the error of CR1, by declaring the entire Device 0 in error in CB10. Thus, error correction actions for CB10 and CR1 can be the same.

FIG. 9A is a logical representation of a lockstep action to produce an ADDDC state in a buddy rank responsive to an initial device failure, represented as state AR1. The memory controller can generate state AR1 as error correction for states CB10 and CR1. The memory controller creates Rank B as the buddy region for Rank A, where the entire rank is the region affected, as illustrated by each complete rank being in state ADDDC. The failed portion is Device 0 of Rank A.

FIG. 9B is a logical representation of an additional device failure in the failed rank when in an ADDDC state, represented as state CR2. The state previous to state CR2 is when Rank A and Rank B are in a lockstep partnership due to failure in Device 0. The subsequent error detected is Device 1 of Rank A that has failed Device 0.

FIG. 9C is a logical representation of an additional bank failure of a different device when in the failed rank in an ADDDC state, represented as state CB11. The state previous to state CB11 is when Rank A and Rank B are in a lockstep partnership due to failure in Device 0. The subsequent error detected is a failure in Bank 0 of Device 1 of Rank A that has failed Device 0. It will be observed that the subsequent failure is of a different granularity (finer granularity) than Failure 0. However, the ADDDC state at the courser granularity of Rank may be kept even for such a failure as represented in CB11.

Figure 9H:
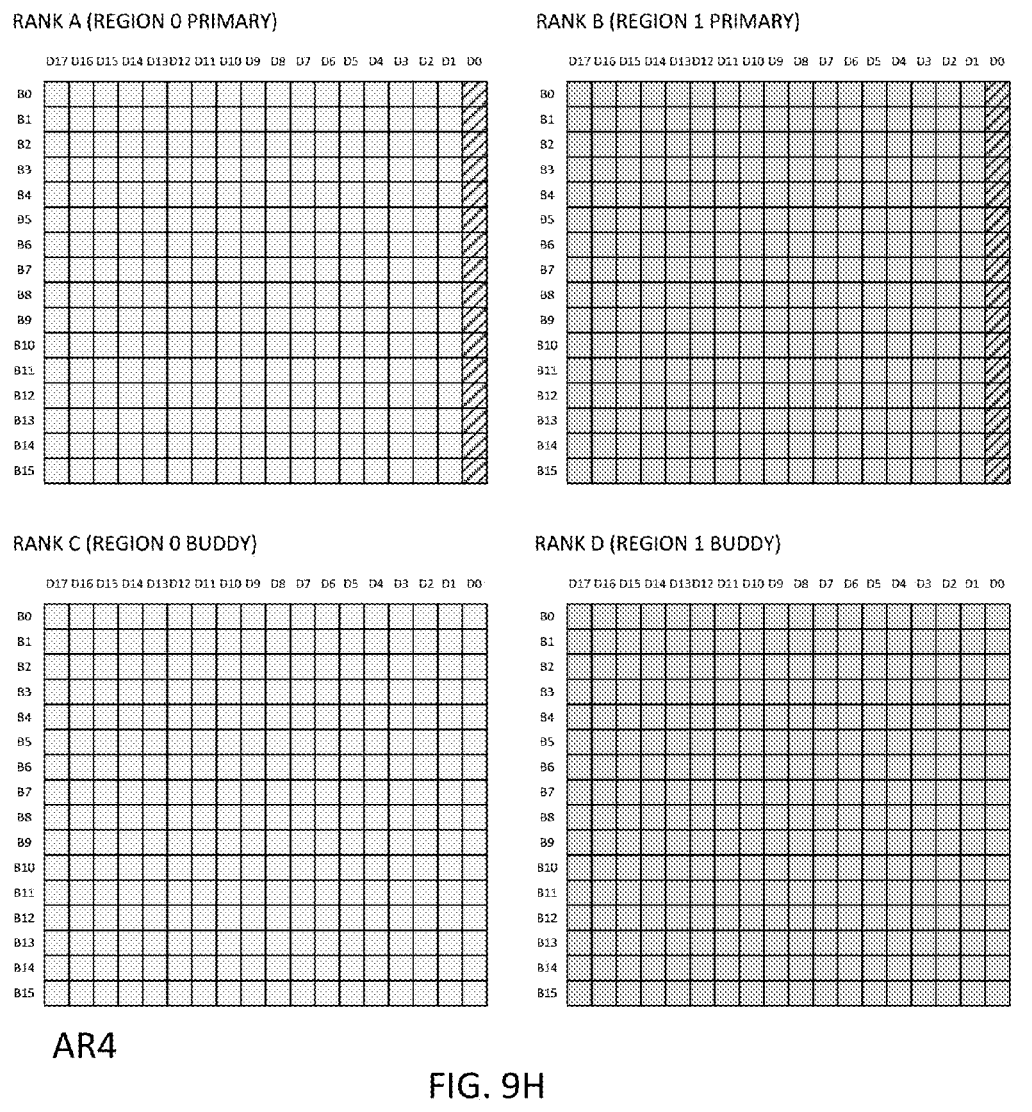

FIG. 9D is a logical representation of a lockstep action to produce an ADDDC+1 state responsive to an additional device failure, represented as state AR2. It will be observed that state AR2 can be used to respond to either state CB11 or state CR2. In state AR2, device 1 is declared as failed, and Ranks A and B are elevated to ADDDC+1. In one embodiment, state AR2 could be reversed by spreading the errors in Ranks A and B to other ranks in different (changed) lockstep partnerships, such as what is represented in FIG. 9H.

FIG. 9E is a logical representation of a same device failure in the buddy rank when in an ADDDC state, represented as state CR3. In state CR3, Device 0 of Rank B is detected as a subsequent failure when Rank A and Rank B are already in a lockstep partnership in ADDDC. Thus, Device 0 of Rank B is Failure 1 and Device 0 of Rank A is Failure 0.

FIG. 9F is a logical representation of a new bank failure in the same device in the buddy rank when in an ADDDC state, represented as state CB9. In state CB9, the failure of Bank 0 of Device 0 is a same device failure in the buddy Rank B. State CB9 can be thought of as a logical equivalent to the failure of CR3 even though the failure is of a different granularity (bank failure versus device failure).

FIG. 9G is a logical representation of a lockstep action to produce an ADDDC+1 state responsive to an additional failure in the buddy rank, represented as state AR3. State AR3 represents a typical error correction action for state CR3 or for state CB9, in which the memory controller maps out Device 0 of Rank B as a failing device. Typically, the memory controller will also initiate a service call because the failure region cannot handle a third device failure.

FIG. 9H is a logical representation of a lockstep action to reassign lockstep partnerships to remain in an ADDDC state with buddy regions mapped to new ranks responsive to a same device failure in the buddy region, represented as state AR4. Instead of taking the traditional action of AR3, in one embodiment, the system can delay the service call when the memory controller finds a new lockstep partner for each half of the lockstep pair in response to the subsequent failure. Instead of mapping out the second device in the same lockstep region and elevating the failure to ADDDC+1, in one embodiment the memory controller finds new lockstep partners in other ranks. In one embodiment, the system employs reverse sparing the region back to a non-lockstep configuration, followed by two forward sparing operations.

In one embodiment, after reversing the lockstep partnership (e.g., via reverse sparing), the memory controller sets Rank A with original Failure 0 as a new lockstep partner with available non-failed Rank C. Additionally, Rank B with original Failure 1 is matched as lockstep partner with non-failed Rank D. Seeing that Rank B and Rank D are now lockstep partners, the failure of Device 0 in Rank B is now Failure 0. Both lockstep partnerships are now in ADDDC. Thus, AR4 creates two ADDDC regions, each with one device mapped out, instead of a single ADDDC+1 region with two devices mapped out. AR4 can therefore delay a service call for a subsequent failure.

Figure 9I:
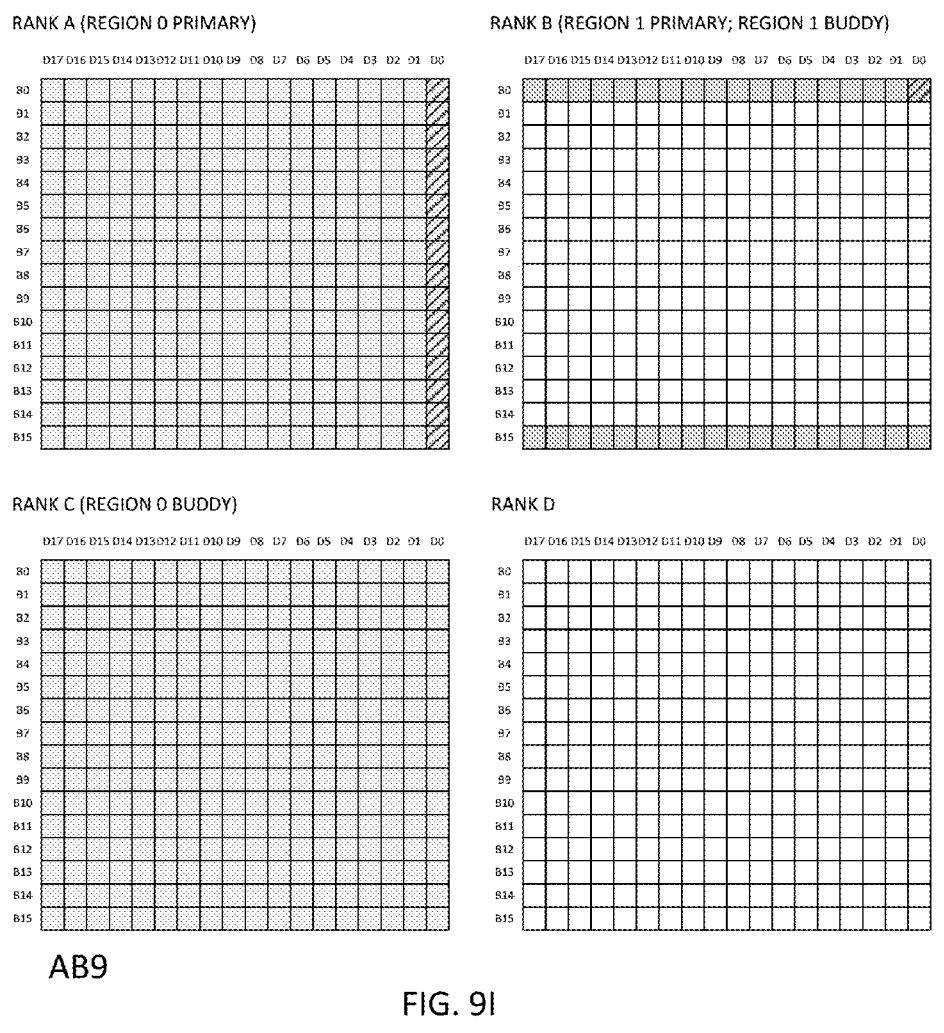

FIG. 9I is a logical representation of a lockstep action to reassign lockstep partnerships to remain in an ADDDC state with a new buddy rank for a rank with a failed device, and a buddy bank within the previous buddy rank responsive to a new bank failure in the same device of the buddy region, represented as state AB9. In state AB9, as with state AR4, the system can delay a service call when the memory controller finds a new lockstep partner for each half of the lockstep pair in response to the subsequent failure. The failure addressed in AB9 is a subsequent bank failure in the buddy Rank or buddy region. Thus, the memory controller does not need to map out the entire Rank B to a new non-failed rank, but can simply remap a lockstep partnership for the failed Bank 0.

In one embodiment, after reversing the lockstep partnership (e.g., via reverse sparing), the memory controller sets Rank A with original Failure 0 as a new lockstep partner with available non-failed Rank C. Additionally, Bank 0 of Rank B with original Failure 1 is matched as lockstep partner with non-failed Bank 15 (or other bank) of Rank B. Seeing that Bank 0 and Bank 15 of Rank B are new lockstep partners, the failure of Bank 0 is now Failure 0. Both lockstep partnerships are now in ADDDC. Thus, like AR4, state AB9 creates two ADDDC regions, each with one device mapped out, instead of a single ADDDC+1 region with two devices mapped out. AB9 can therefore delay a service call for a subsequent failure.

Figure 10:
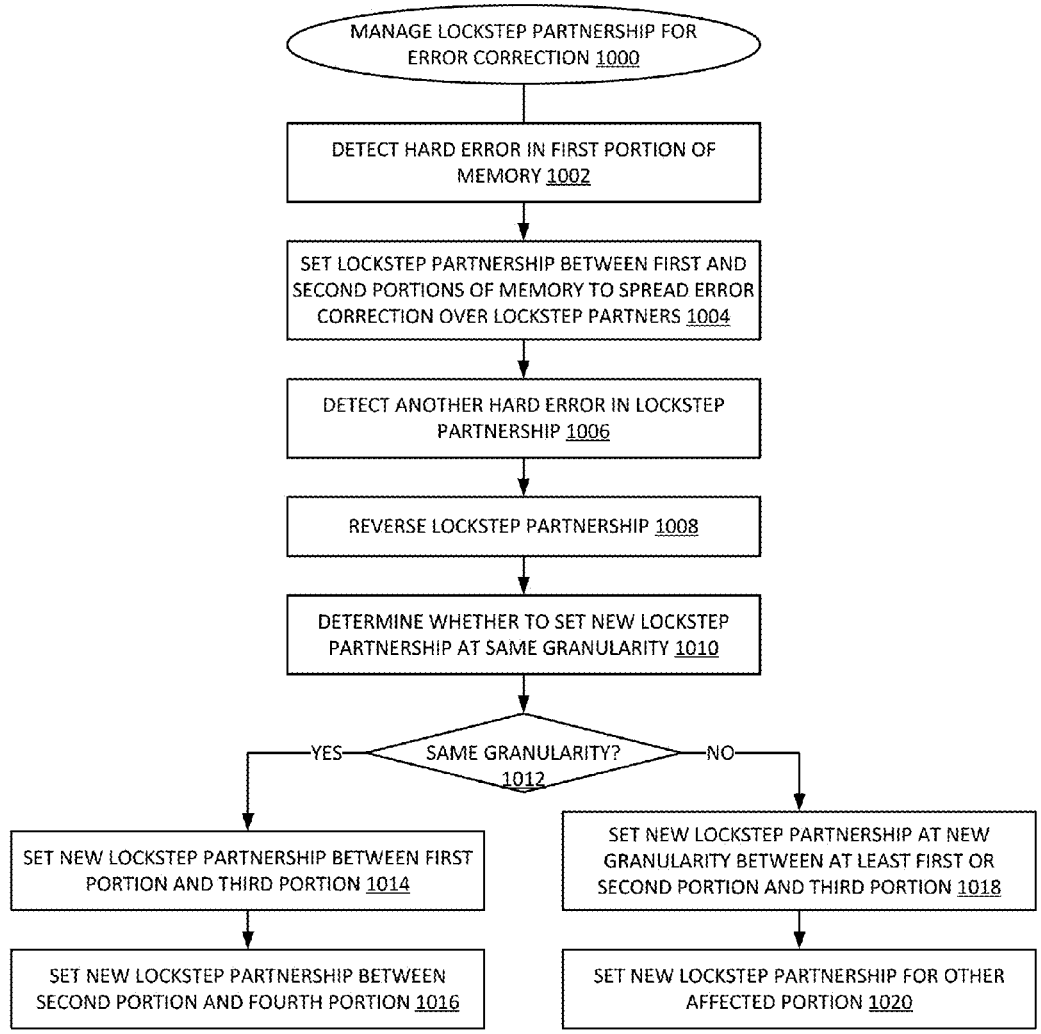
FIG. 10 is a flow diagram of an embodiment of a process for dynamically managing lockstep configuration.

FIG. 10 is a flow diagram of an embodiment of a process for dynamically managing lockstep configuration. Process 1000 can be performed by a memory controller, such as an error engine and/or other lockstep management logic of the memory controller, to manage the lockstep partnerships in the system for error correction. Error detection logic of the memory controller detects a hard error in a first portion of memory, 1002. The first portion can be of any granularity monitored by the error detection logic. In one embodiment, the memory controller sets a lockstep partnership between the first portion and a second portion of memory to spread error correction over the lockstep partners, 1004. In one embodiment, the lockstep partnership is preconfigured. It will be understood that when referring to detecting an error in a "first portion," it is not necessarily that the entire first portion is failed, only that there is a failure within the portion. For example, the first portion could be an entire bank across all devices in a rank, where an error was detected in only one bank of one specific device. The first portion is matched as a lockstep partner with a second portion of the same size.

After generating the lockstep partnership to spread the error correction, or after applying a lockstep partnership that is preconfigured, the error detection logic detects another hard error in the lockstep partnership, 1006. The subsequent error can be any of a number of different errors, as described above. A subsequent error in a portion of the memory outside the lockstep partnership can either be handled with a different partnership being created or with a service call. However, a subsequent error in a portion that is included in the lockstep partnership can be handled in one embodiment by a change in the lockstep partnership. In one embodiment, the subsequent error can be handled without a service call if the second error occurs in the other half of the lockstep partnership as compared to the first error. Thus, in one embodiment, the memory controller cancels or reverses or unsets the lockstep partnership, 1008.

In one embodiment, the memory controller changes lockstep partners when a second portion failure is not on the same lockstep half as the existing mapped out device and there is enough non-failed memory to support adding a new virtual lockstep pair. In one embodiment, the memory controller dynamically changes lockstep partners in a system that supports virtual lockstep (such as ADDDC). In one embodiment, the memory controller dynamically changes lockstep partners in a system that employs lockstep but not virtual lockstep (such as DDDC). The lockstep mechanism and the mechanisms for changing the lockstep partner can be applied at different granularities.

In one embodiment, the memory controller determines whether to create or set a new lockstep partnership at the same granularity as the previous partnership, or whether to use one or more new partnerships of a different granularity, 1010. In one embodiment, if the same granularity is to be used, 1012 YES branch, the memory controller sets a new lockstep partnership between the first portion and a third non-failed portion of memory, 1014. The memory controller can keep a status log of all portions of the memory, and can thus determine whether a portion is failed or non-failed. In evaluating lockstep partnerships in response to a subsequent error detected, the memory controller can evaluate the status of memory portions to determine if there is a non-failed portion to use as an alternate lockstep partner. In one embodiment, the memory controller sets a new lockstep partnership between the second portion and a fourth portion of memory, 1016. Again, seeing that the same granularity is used, it will be understood that the third and fourth portions are of the same size as the first and third portions.

In one embodiment, the memory controller determines to change granularity in the lockstep partnership, 1012 NO branch. When changing granularity, in one embodiment, the memory controller sets a new lockstep partnership at a new granularity between either the first or the second portions and a third portion of a different granularity, 1018. The memory controller can then set a new lockstep partnership for the other affected portion, 1020. The other new lockstep partnership can be of the same granularity as the first and second portions, or can be of a different granularity also.

In one embodiment, the determination to change the granularity can include determining that a subsequent error can be grouped with one or more previous errors by adjusting to a higher or courser granularity, and setting a new lockstep partnership between portions at the courser granularity. Thus, for example, for a subsequent bank failure in the same DRAM that already has at least one failed bank, the memory controller can determine to fail the entire DRAM. Then, the memory controller can set a new partnership based on partnering up the failed DRAM with a non-failed DRAM by mapping the data of the whole DRAM out.

Figure 11:
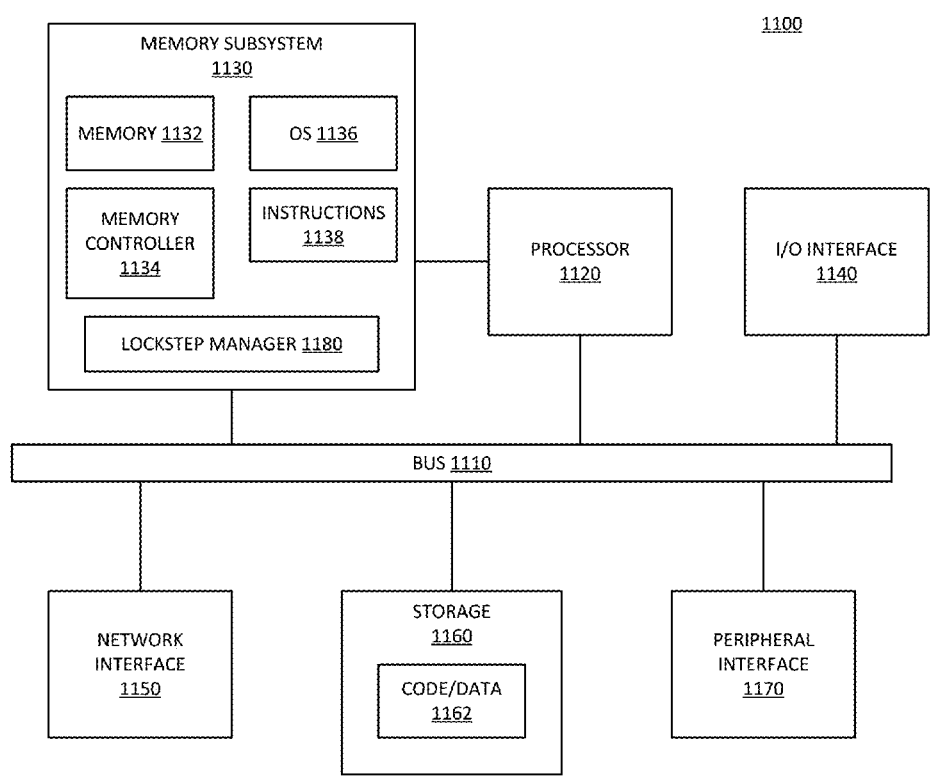
FIG. 11 is a block diagram of an embodiment of a computing system in which dynamic lockstep management can be implemented.

FIG. 11 is a block diagram of an embodiment of a computing system in which dynamic lockstep management can be implemented. System 1100 represents a computing device in accordance with any embodiment described herein, and can be a laptop computer, a desktop computer, a server, a gaming or entertainment control system, a scanner, copier, printer, routing or switching device, or other electronic device. System 1100 includes processor 1120, which provides processing, operation management, and execution of instructions for system 1100. Processor 1120 can include any type of microprocessor, central processing unit (CPU), processing core, or other processing hardware to provide processing for system 1100. Processor 1120 controls the overall operation of system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 1130 represents the main memory of system 1100, and provides temporary storage for code to be executed by processor 1120, or data values to be used in executing a routine. Memory subsystem 1130 can include one or more memory devices such as read-only memory (ROM), flash memory, one or more varieties of random access memory (RAM), or other memory devices, or a combination of such devices. Memory subsystem 1130 stores and hosts, among other things, operating system (OS) 1136 to provide a software platform for execution of instructions in system 1100. Additionally, other instructions 1138 are stored and executed from memory subsystem 1130 to provide the logic and the processing of system 1100. OS 1136 and instructions 1138 are executed by processor 1120. Memory subsystem 1130 includes memory device 1132 where it stores data, instructions, programs, or other items. In one embodiment, memory subsystem includes memory controller 1134, which is a memory controller to generate and issue commands to memory device 1132. It will be understood that memory controller 1134 could be a physical part of processor 1120.

Processor 1120 and memory subsystem 1130 are coupled to bus/bus system 1110. Bus 1110 is an abstraction that represents any one or more separate physical buses, communication lines/interfaces, and/or point-to-point connections, connected by appropriate bridges, adapters, and/or controllers. Therefore, bus 1110 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 1110 can also correspond to interfaces in network interface 1150.

System 1100 also includes one or more input/output (I/O) interface(s) 1140, network interface 1150, one or more internal mass storage device(s) 1160, and peripheral interface 1170 coupled to bus 1110. I/O interface 1140 can include one or more interface components through which a user interacts with system 1100 (e.g., video, audio, and/or alphanumeric interfacing). Network interface 1150 provides system 1100 the ability to communicate with remote devices (e.g., servers, other computing devices) over one or more networks. Network interface 1150 can include an Ethernet adapter, wireless interconnection components, USB (universal serial bus), or other wired or wireless standards-based or proprietary interfaces.

Storage 1160 can be or include any conventional medium for storing large amounts of data in a nonvolatile manner, such as one or more magnetic, solid state, or optical based disks, or a combination. Storage 1160 holds code or instructions and data 1162 in a persistent state (i.e., the value is retained despite interruption of power to system 1100). Storage 1160 can be generically considered to be a "memory," although memory 1130 is the executing or operating memory to provide instructions to processor 1120. Whereas storage 1160 is nonvolatile, memory 1130 can include volatile memory (i.e., the value or state of the data is indeterminate if power is interrupted to system 1100).

Peripheral interface 1170 can include any hardware interface not specifically mentioned above. Peripherals refer generally to devices that connect dependently to system 1100. A dependent connection is one where system 1100 provides the software and/or hardware platform on which operation executes, and with which a user interacts.

In one embodiment, memory subsystem 1130 includes lockstep manager 1180, which can be memory management in accordance with any embodiment described herein. In one embodiment, lockstep manager 1180 is part of memory controller 1134. Manager 1180 can perform forward and reverse sparing. In particular, manager 1180 can employ reverse sparing to reverse a lockstep partnership assignment and reassign one or both of the lockstep partners to new lockstep partnerships. In one embodiment, system 1100 is a server system that includes multiple server boards or server blades in a chassis system. Each blade can include multiple processors 1170, and many memory devices 1132. In one embodiment, lockstep manager 1180 can dynamically change lockstep partnerships for portions of devices 1132.

Figure 12:
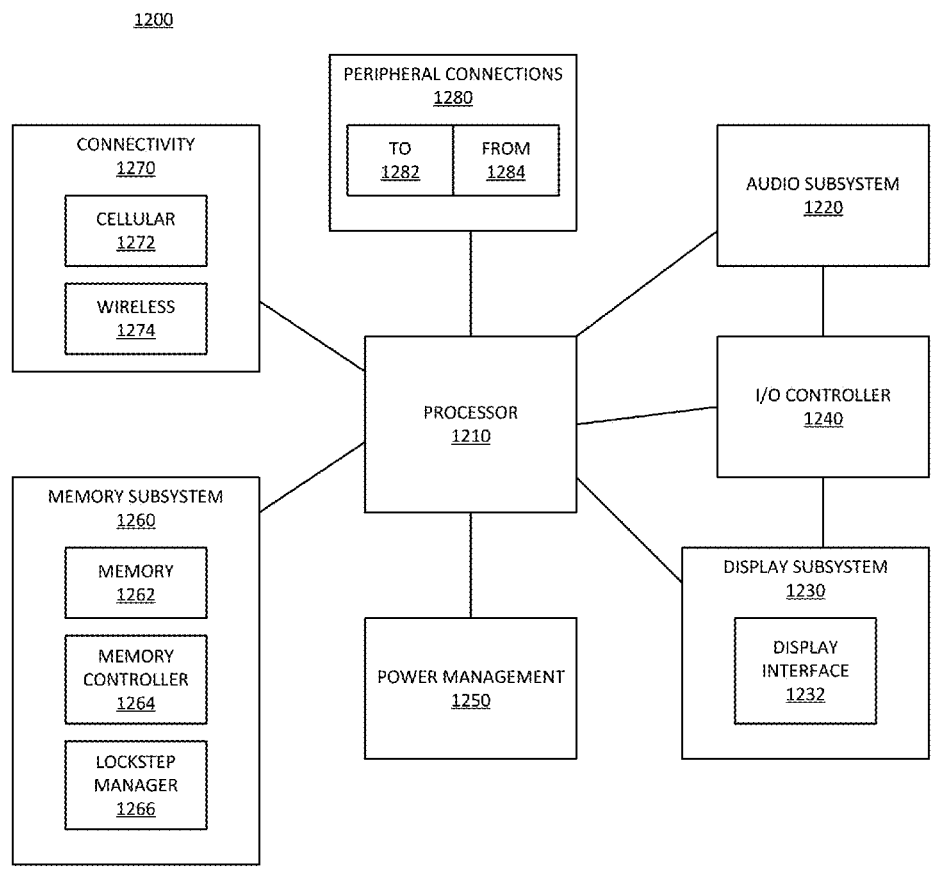
FIG. 12 is a block diagram of an embodiment of a mobile device in which dynamic lockstep management can be implemented.

FIG. 12 is a block diagram of an embodiment of a mobile device in which dynamic lockstep management can be implemented. Device 1200 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 1200.

Device 1200 includes processor 1210, which performs the primary processing operations of device 1200. Processor 1210 can include one or more physical devices, such as microprocessors, application processors, microcontrollers, programmable logic devices, or other processing means. The processing operations performed by processor 1210 include the execution of an operating platform or operating system on which applications and/or device functions are executed. The processing operations include operations related to I/O (input/output) with a human user or with other devices, operations related to power management, and/or operations related to connecting device 1200 to another device. The processing operations can also include operations related to audio I/O and/or display I/O.

In one embodiment, device 1200 includes audio subsystem 1220, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1200, or connected to device 1200. In one embodiment, a user interacts with device 1200 by providing audio commands that are received and processed by processor 1210.

Display subsystem 1230 represents hardware (e.g., display devices) and software (e.g., drivers) components that provide a visual and/or tactile display for a user to interact with the computing device. Display subsystem 1230 includes display interface 1232, which includes the particular screen or hardware device used to provide a display to a user. In one embodiment, display interface 1232 includes logic separate from processor 1210 to perform at least some processing related to the display. In one embodiment, display subsystem 1230 includes a touchscreen device that provides both output and input to a user. In one embodiment, display subsystem 1230 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

I/O controller 1240 represents hardware devices and software components related to interaction with a user. I/O controller 1240 can operate to manage hardware that is part of audio subsystem 1220 and/or display subsystem 1230. Additionally, I/O controller 1240 illustrates a connection point for additional devices that connect to device 1200 through which a user might interact with the system. For example, devices that can be attached to device 1200 might include microphone devices, speaker or stereo systems, video systems or other display device, keyboard or keypad devices, or other I/O devices for use with specific applications such as card readers or other devices.

As mentioned above, I/O controller 1240 can interact with audio subsystem 1220 and/or display subsystem 1230. For example, input through a microphone or other audio device can provide input or commands for one or more applications or functions of device 1200. Additionally, audio output can be provided instead of or in addition to display output. In another example, if display subsystem includes a touchscreen, the display device also acts as an input device, which can be at least partially managed by I/O controller 1240. There can also be additional buttons or switches on device 1200 to provide I/O functions managed by I/O controller 1240.

In one embodiment, I/O controller 1240 manages devices such as accelerometers, cameras, light sensors or other environmental sensors, gyroscopes, global positioning system (GPS), or other hardware that can be included in device 1200. The input can be part of direct user interaction, as well as providing environmental input to the system to influence its operations (such as filtering for noise, adjusting displays for brightness detection, applying a flash for a camera, or other features). In one embodiment, device 1200 includes power management 1250 that manages battery power usage, charging of the battery, and features related to power saving operation.

Memory subsystem 1260 includes memory device(s) 1262 for storing information in device 1200. Memory subsystem 1260 can include nonvolatile (state does not change if power to the memory device is interrupted) and/or volatile (state is indeterminate if power to the memory device is interrupted) memory devices. Memory 1260 can store application data, user data, music, photos, documents, or other data, as well as system data (whether long-term or temporary) related to the execution of the applications and functions of system 1200. In one embodiment, memory subsystem 1260 includes memory controller 1264 (which could also be considered part of the control of system 1200, and could potentially be considered part of processor 1210). Memory controller 1264 includes a scheduler to generate and issue commands to memory device 1262.

Connectivity 1270 includes hardware devices (e.g., wireless and/or wired connectors and communication hardware) and software components (e.g., drivers, protocol stacks) to enable device 1200 to communicate with external devices. The external device could be separate devices, such as other computing devices, wireless access points or base stations, as well as peripherals such as headsets, printers, or other devices.

Connectivity 1270 can include multiple different types of connectivity. To generalize, device 1200 is illustrated with cellular connectivity 1272 and wireless connectivity 1274. Cellular connectivity 1272 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1274 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 1280 include hardware interfaces and connectors, as well as software components (e.g., drivers, protocol stacks) to make peripheral connections. It will be understood that device 1200 could both be a peripheral device ("to" 1282) to other computing devices, as well as have peripheral devices ("from" 1284) connected to it. Device 1200 commonly has a "docking" connector to connect to other computing devices for purposes such as managing (e.g., downloading and/or uploading, changing, synchronizing) content on device 1200. Additionally, a docking connector can allow device 1200 to connect to certain peripherals that allow device 1200 to control content output, for example, to audiovisual or other systems.

In addition to a proprietary docking connector or other proprietary connection hardware, device 1200 can make peripheral connections 1280 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, memory subsystem 1260 includes lockstep manager 1266, which can be memory management in accordance with any embodiment described herein. In one embodiment, lockstep manager 1266 is part of memory controller 1264. Manager 1266 can perform forward and reverse sparing. In particular, manager 1266 can employ reverse sparing to reverse a lockstep partnership assignment and reassign one or both of the lockstep partners to new lockstep partnerships.

In one aspect, a method for managing errors in a memory subsystem includes: detecting a hard error in a first memory portion set in a lockstep partnership as a lockstep partner with a second memory portion, wherein error correction is to be spread over the lockstep partners; responsive to detecting the hard error, canceling the lockstep partnership between the first memory portion and the second memory portion; creating a new lockstep partnership between the first memory portion and a third memory portion as lockstep partners; and creating a new lockstep partnership between the second memory portion and a fourth memory portion as lockstep partners.

In one embodiment, detecting the hard error comprises detecting a second hard error in the lockstep partnership. In one embodiment, the lockstep partnership comprises a virtual lockstep partnership where the hard error is mapped out to a spare memory portion. In one embodiment, the first and second memory portions comprise ranks of memory. In one embodiment, the first and second memory portions comprise banks of memory. In one embodiment, the first and second memory portions comprise DRAM (dynamic random access memory) devices. In one embodiment, the first and second memory portions comprise DRAM devices in separate ranks. In one embodiment, the third and fourth memory portions comprise DRAM devices in different ranks. In one embodiment, at least one of creating the new lockstep partnership between the first memory portion and a third memory portion as lockstep partners or creating the new lockstep partnership between the second memory portion and a fourth memory portion as lockstep partners includes changing a level of granularity of the lockstep partnership. In one embodiment, detecting the hard error in the first memory portion comprises detecting a hard error in a memory portion that can be grouped with the first memory portion at a different level of granularity, and wherein creating the new lockstep partnership comprises creating a new lockstep partnership between the first memory portion and the third memory portion at the different level of granularity. In one embodiment, creating the new lockstep partnerships comprises dynamically changing a lockstep partnership entry in a lockstep table. In one embodiment, detecting the hard error comprises detecting a second hard error, and further comprising, prior to detecting the second hard error: detecting a first hard error in either the first or the second memory portions; setting an original lockstep partnership between the first memory portion and the second memory portion as lockstep partners in response to detecting the first hard error. In one embodiment, detecting the hard error comprises detecting the hard error in the first memory portion set in a predetermined lockstep partnership with the second memory portion.

In one aspect, a memory management device to manage errors in an associated memory subsystem includes: error detection logic to detect a hard error in a first memory portion of the memory subsystem, wherein the first memory portion is set in a lockstep partnership as a lockstep partner with a second memory portion, wherein error correction is to be spread over the lockstep partners; and error correction logic to cancel the lockstep partnership between the first and second memory portions responsive to detecting the hard error in the first memory portion, and to create a new lockstep partnerships between the first memory portion and a third memory portion as lockstep partners and between the second memory portion and a fourth memory portion as lockstep partners.

In one aspect, the memory management device is included in a memory controller of a memory subsystem including multiple DRAMs (dynamic random access memory devices) each including a memory array, wherein the memory arrays are addressable according to multiple different levels of granularity; wherein the memory controller includes error detection logic to detect a hard error in a first memory portion of the memory subsystem, wherein the first memory portion is set in a lockstep partnership as a lockstep partner with a second memory portion, wherein error correction is to be spread over the lockstep partners; and error correction logic to cancel the lockstep partnership between the first and second memory portions responsive to detecting the hard error in the first memory portion, and to create a new lockstep partnerships between the first memory portion and a third memory portion as lockstep partners and between the second memory portion and a fourth memory portion as lockstep partners; and wherein the memory subsystem is incorporated into a chassis system to couple to a blade server.

In one embodiment, the lockstep partnership comprises a virtual lockstep partnership where the hard error is mapped out to a spare memory portion. In one embodiment, the first and second memory portions comprise one of ranks of memory, banks of memory, or DRAM (dynamic random access memory) devices. In one embodiment, the first and second memory portions comprise DRAM devices in separate ranks. In one embodiment, the third and fourth memory portions comprise DRAM devices in different ranks. In one embodiment, the error correction logic is to change a level of granularity of at least one lockstep partnership when creating the new lockstep partnership between the first memory portion and a third memory portion as lockstep partners, or the new lockstep partnership between the second memory portion and a fourth memory portion as lockstep partners. In one embodiment, the error detection logic is to detect the hard error in a memory portion that can be grouped with the first memory portion at a different level of granularity, and wherein the error correction logic is to create the new lockstep partnership between the first memory portion and the third memory portion at the different level of granularity. In one embodiment, the error correction logic is to create the new lockstep partnerships by dynamically changing a lockstep partnership entry in a lockstep table. In one embodiment, the error detection logic is to a second hard error, and further comprising, prior to detecting the second hard error, the error detection logic is to detect a first hard error in either the first or the second memory portions; and the error correction logic is to set an original lockstep partnership between the first memory portion and the second memory portion as lockstep partners in response to detecting the first hard error. In one embodiment, the error detection logic is to detect the hard error in the first memory portion set in a predetermined lockstep partnership with the second memory portion.

In one aspect, an apparatus for managing errors in a memory subsystem includes: means for detecting a hard error in a first memory portion set in a lockstep partnership as a lockstep partner with a second memory portion, wherein error correction is to be spread over the lockstep partners; means for responsive to detecting the hard error, canceling the lockstep partnership between the first memory portion and the second memory portion; means for creating a new lockstep partnership between the first memory portion and a third memory portion as lockstep partners; and means for creating a new lockstep partnership between the second memory portion and a fourth memory portion as lockstep partners. The apparatus can includes mean for performing operations in accordance with any embodiment of the method as set forth above.

In one aspect, an article of manufacture comprising a computer readable storage medium having content stored thereon, which when accessed causes a machine to perform operations including: detecting a hard error in a first memory portion set in a lockstep partnership as a lockstep partner with a second memory portion, wherein error correction is to be spread over the lockstep partners; responsive to detecting the hard error, canceling the lockstep partnership between the first memory portion and the second memory portion; creating a new lockstep partnership between the first memory portion and a third memory portion as lockstep partners; and creating a new lockstep partnership between the second memory portion and a fourth memory portion as lockstep partners. The article of manufacture can includes content for performing operations in accordance with any embodiment of the method as set forth above.

In one aspect, a method for managing errors in a memory subsystem includes: detecting a hard error in a first memory portion; setting a lockstep partnership between the first memory portion and a second memory portion as lockstep partners, wherein error correction is spread over the first and second memory portions; detecting a hard error in the second memory portion; responsive to detecting the hard error in the second memory portion, reversing the lockstep partnership between the first memory portion and the second memory portion; setting a new lockstep partnership between the first memory portion and a third memory portion as lockstep partners; and setting a new lockstep partnership between the second memory portion and a fourth memory portion as lockstep partners.

In one embodiment, detecting the hard error comprises detecting a second hard error in the lockstep partnership. In one embodiment, the lockstep partnership comprises a virtual lockstep partnership where the hard error is mapped out to a spare memory portion. In one embodiment, the first and second memory portions comprise ranks of memory. In one embodiment, the first and second memory portions comprise banks of memory. In one embodiment, the first and second memory portions comprise DRAM (dynamic random access memory) devices. In one embodiment, the first and second memory portions comprise DRAM devices in separate ranks. In one embodiment, the third and fourth memory portions comprise DRAM devices in different ranks. In one embodiment, at least one of setting the new lockstep partnership between the first memory portion and a third memory portion as lockstep partners or setting the new lockstep partnership between the second memory portion and a fourth memory portion as lockstep partners includes changing a level of granularity of the lockstep partnership. In one embodiment, detecting the hard error in the first memory portion comprises detecting a hard error in a memory portion that can be grouped with the first memory portion at a different level of granularity, and wherein setting the new lockstep partnership comprises setting a new lockstep partnership between the first memory portion and the third memory portion at the different level of granularity. In one embodiment, setting the new lockstep partnerships comprises dynamically changing a lockstep partnership entry in a lockstep table. In one embodiment, setting the original lockstep partnership between the first memory portion and the second memory portion as lockstep partners comprises implementing an adaptive dual device data correction (ADDDC) operation.

In one aspect, a memory management device to manage errors in an associated memory subsystem includes: error detection logic to detect a first hard error in a first memory portion of the memory subsystem, and subsequently detect second hard error; and error correction logic to set a lockstep partnership between the first memory portion and the second memory portion as lockstep partners in response to detecting the first hard error, to spread error correction over the first and second memory portions, and to reverse the lockstep partnership between the first and second memory portions responsive to subsequently detecting the second hard error, and to set a new lockstep partnerships between the first memory portion and a third memory portion as lockstep partners and between the second memory portion and a fourth memory portion as lockstep partners responsive to subsequently detecting the second hard error.

In one aspect, the memory management device is included in a memory controller of a memory subsystem including multiple DRAMs (dynamic random access memory devices) each including a memory array, wherein the memory arrays are addressable according to multiple different levels of granularity; wherein the memory controller includes error detection logic to detect a first hard error in a first memory portion of the memory subsystem, and subsequently detect second hard error; and error correction logic to set a lockstep partnership between the first memory portion and the second memory portion as lockstep partners in response to detecting the first hard error, to spread error correction over the first and second memory portions, and to reverse the lockstep partnership between the first and second memory portions responsive to subsequently detecting the second hard error, and to set a new lockstep partnerships between the first memory portion and a third memory portion as lockstep partners and between the second memory portion and a fourth memory portion as lockstep partners responsive to subsequently detecting the second hard error; and wherein the memory subsystem is incorporated into a chassis system to couple to a blade server.

In one embodiment, the lockstep partnership comprises a virtual lockstep partnership where the hard error is mapped out to a spare memory portion. In one embodiment, the first and second memory portions comprise one of ranks of memory, banks of memory, or DRAM (dynamic random access memory) devices. In one embodiment, the first and second memory portions comprise DRAM devices in separate ranks. In one embodiment, the third and fourth memory portions comprise DRAM devices in different ranks. In one embodiment, the error correction logic is to change a level of granularity of at least one lockstep partnership when setting the new lockstep partnership between the first memory portion and a third memory portion as lockstep partners, or the new lockstep partnership between the second memory portion and a fourth memory portion as lockstep partners. In one embodiment, the error detection logic is to detect the hard error in a memory portion that can be grouped with the first memory portion at a different level of granularity, and wherein the error correction logic is to set the new lockstep partnership between the first memory portion and the third memory portion at the different level of granularity. In one embodiment, the error correction logic is to set the new lockstep partnerships by dynamically changing a lockstep partnership entry in a lockstep table. In one embodiment, the error correction logic is to set the original lockstep partnership between the first memory portion and the second memory portion as lockstep partners as an operation of an adaptive dual device data correction (ADDDC) implementation.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:
1. A method for managing errors in a memory subsystem, comprising:
  detecting a hard error in a first memory portion set in a lockstep partnership as a lockstep partner with a second memory portion, wherein error correction is to be spread over the lockstep partners;
responsive to detecting the hard error, canceling the lockstep partnership between the first memory portion and the second memory portion;
creating a new lockstep partnership between the first memory portion and a third memory portion as lockstep partners; and
creating a new lockstep partnership between the second memory portion and a fourth memory portion as lockstep partners.

2. The method of claim 1, wherein detecting the hard error comprises detecting a second hard error in the lockstep partnership.

3. The method of claim 1, wherein the lockstep partnership comprises a virtual lockstep partnership where the hard error is mapped out to a spare memory portion.

4. The method of claim 1, wherein the first and second memory portions comprise ranks of memory.

5. The method of claim 1, wherein the first and second memory portions comprise banks of memory.

6. The method of claim 1, wherein the first and second memory portions comprise DRAM (dynamic random access memory) devices.

7. The method of claim 6, wherein the first and second memory portions comprise DRAM devices in separate ranks.

8. The method of claim 6, wherein the third and fourth memory portions comprise DRAM devices in different ranks.

9. The method of claim 1, wherein at least one of creating the new lockstep partnership between the first memory portion and a third memory portion as lockstep partners or creating the new lockstep partnership between the second memory portion and a fourth memory portion as lockstep partners includes changing a level of granularity of the lockstep partnership.

10. The method of claim 9, wherein detecting the hard error in the first memory portion comprises detecting a hard error in a memory portion that can be grouped with the first memory portion at a different level of granularity, and wherein creating the new lockstep partnership comprises creating a new lockstep partnership between the first memory portion and the third memory portion at the different level of granularity.

11. The method of claim 1, wherein creating the new lockstep partnerships comprises dynamically changing a lockstep partnership entry in a lockstep table.

12. A memory management device to manage errors in an associated memory subsystem, comprising:
a hardware interface to couple with multiple memory portions over a bus;
processor circuitry to execute error detection logic to detect a hard error in a first memory portion of the memory subsystem, wherein the first memory portion is set in a lockstep partnership as a lockstep partner with a second memory portion, wherein error correction is to be spread over the lockstep partners; and
processor circuitry to execute error correction logic to cancel the lockstep partnership between the first and second memory portions responsive to detecting the hard error in the first memory portion, and to create a new lockstep partnerships between the first memory portion and a third memory portion as lockstep partners and between the second memory portion and a fourth memory portion as lockstep partners.

13. The memory management device of claim 12, wherein the lockstep partnership comprises a virtual lockstep partnership where the hard error is mapped out to a spare memory portion.

14. The memory management device of claim 12, wherein the first and second memory portions comprise one of ranks of memory, banks of memory, or DRAM (dynamic random access memory) devices.

15. The memory management device of claim 14, wherein the first and second memory portions comprise DRAM devices in separate ranks.

16. The memory management device of claim 14, wherein the third and fourth memory portions comprise DRAM devices in different ranks.

17. The memory management device of claim 12, wherein the error correction logic is to change a level of granularity of at least one lockstep partnership when creating the new lockstep partnership between the first memory portion and a third memory portion as lockstep partners, or the new lockstep partnership between the second memory portion and a fourth memory portion as lockstep partners.

18. The memory management device of claim 17, wherein the error detection logic is to detect the hard error in a memory portion that can be grouped with the first memory portion at a different level of granularity, and wherein the error correction logic is to create the new lockstep partnership between the first memory portion and the third memory portion at the different level of granularity.

19. An electronic device with a memory subsystem, comprising:
multiple DRAMs (dynamic random access memory devices) each including a memory array, wherein the memory arrays are addressable according to multiple different levels of granularity;
a memory controller to control access to the DRAM, the memory controller including
error detection logic to detect a hard error in a first memory portion of the memory subsystem, wherein the first memory portion is set in a lockstep partnership as a lockstep partner with a second memory portion, wherein error correction is to be spread over the lockstep partners; and
error correction logic to cancel the lockstep partnership between the first and second memory portions responsive to detecting the hard error in the first memory portion, and to create a new lockstep partnerships between the first memory portion and a third memory portion as lockstep partners and between the second memory portion and a fourth memory portion as lockstep partners; and
a chassis system to couple the memory system to a blade server.

20. The electronic device of claim 19, wherein the lockstep partnership comprises a virtual lockstep partnership where the hard error is mapped out to a spare memory portion.

21. The electronic device of claim 19, wherein the first and second memory portions comprise one of ranks of memory, banks of memory, or DRAM (dynamic random access memory) devices.

22. The electronic device of claim 19, wherein the error correction logic is to change a level of granularity of at least one lockstep partnership when creating the new lockstep partnership between the first memory portion and a third memory portion as lockstep partners, or the new lockstep partnership between the second memory portion and a fourth memory portion as lockstep partners.

* * * * *